US012345087B2

(12) United States Patent
Eliasson et al.

(10) Patent No.: US 12,345,087 B2
(45) Date of Patent: Jul. 1, 2025

(54) DOOR OPERATOR SYSTEM

(71) Applicant: Assa Abloy Entrance Systems AB, Landskrona (SE)

(72) Inventors: Daniel Eliasson, Lund (SE); Anton Hansson, Kivik (SE)

(73) Assignee: Assa Abloy Entrance Systems AB, Landskrona (SE)

( * ) Notice: Subject to any disclaimer, the term of this patent is extended or adjusted under 35 U.S.C. 154(b) by 0 days.

(21) Appl. No.: 18/010,769

(22) PCT Filed: Jun. 24, 2021

(86) PCT No.: PCT/EP2021/067276
§ 371 (c)(1),
(2) Date: Dec. 15, 2022

(87) PCT Pub. No.: WO2021/260085
PCT Pub. Date: Dec. 30, 2021

(65) Prior Publication Data

US 2023/0265705 A1 Aug. 24, 2023

(30) Foreign Application Priority Data

Jun. 25, 2020 (SE) .................................... 2030212-1

(51) Int. Cl.
*E05F 15/67* (2015.01)
*E05F 15/59* (2015.01)

(52) U.S. Cl.
CPC .............. *E05F 15/67* (2015.01); *E05F 15/59* (2015.01); *E05Y 2201/684* (2013.01);
(Continued)

(58) Field of Classification Search
CPC .... E05F 15/67; E05F 15/59; E05Y 2201/684; E05Y 2201/688; E05Y 2201/716;
(Continued)

(56) References Cited

U.S. PATENT DOCUMENTS 2,755,081 A * 7/1956 Johnson .................. E05F 15/67 188/77 R
4,206,994 A * 6/1980 Silverberg ........... G03G 15/754 198/841

(Continued)

FOREIGN PATENT DOCUMENTS

DE 10261083 3/2004
DE 202019100778 U1 * 6/2019 ............. B66B 11/08

(Continued)

OTHER PUBLICATIONS

International Search Report in PCT/EP2021/067276 mailed Sep. 28, 2021.

(Continued)

*Primary Examiner* — Catherine A Kelly
(74) *Attorney, Agent, or Firm* — Wissing Miller LLP

(57) ABSTRACT

A door operation system opens and closes an opening with a door. A drive unit mounted on the door and having at least one motor moves the door from the closed (C) position to the open (O) position and vice versa. An elongated transmission member extends along a side of the opening. The drive unit includes a driven transmission member in driving connection with the motor that is movably connected to the elongated transmission member and arranged to interplay with said elongated transmission member and to be driven along the elongated transmission member. The elongated transmission member at least partially wraps around the driven transmission member. At least one guide member with a sliding surface with a curvature is mounted to the door to interplay with the elongated transmission member to guide the elongated transmission member into contact with the driven transmission member. The elongated transmission member is configured to slide along the curvature to urge the
(Continued)

elongated transmission member to flex and follow the curvature.

15 Claims, 6 Drawing Sheets

(52) U.S. Cl.
CPC ... *E05Y 2201/688* (2013.01); *E05Y 2201/716* (2013.01); *E05Y 2201/724* (2013.01); *E05Y 2600/46* (2013.01); *E05Y 2900/106* (2013.01)

(58) Field of Classification Search
CPC ......... E05Y 2201/724; E05Y 2201/434; E05Y 2201/638; E05Y 2201/66; E05Y 2600/46; E05Y 2900/46; E05Y 2900/106; E05Y 2900/11; E05D 15/242; E05D 15/24; E05D 15/681; E05D 15/684
USPC ........................................... 49/358, 199, 197
See application file for complete search history.

(56) References Cited

U.S. PATENT DOCUMENTS

| | | | | |
|---|---|---|---|---|
| 4,732,203 | A | 3/1988 | Alten | |
| 5,076,014 | A * | 12/1991 | Cuyl | E05F 11/481 49/140 |
| 5,505,022 | A * | 4/1996 | Shibata | E05F 15/689 49/352 |
| 5,799,441 | A * | 9/1998 | Shibata | E05F 11/481 49/352 |
| 6,151,833 | A * | 11/2000 | Gmurowski | E05F 11/483 49/352 |
| 6,176,039 | B1 * | 1/2001 | Craig | E05F 15/43 49/197 |
| 6,622,431 | B1 * | 9/2003 | Simons | E06B 7/18 49/303 |
| 6,651,385 | B2 * | 11/2003 | Miller | E05F 15/43 49/27 |
| 6,719,032 | B1 * | 4/2004 | Miers | E05F 15/67 160/209 |
| 7,958,676 | B2 * | 6/2011 | Kruger | E05F 11/483 49/352 |
| 8,881,457 | B2 * | 11/2014 | Matsushita | E05F 11/382 49/352 |
| 9,255,433 | B2 * | 2/2016 | Imaoka | E05F 11/488 |
| 10,190,352 | B2 * | 1/2019 | Imaoka | E05F 11/486 |
| 11,512,490 | B2 * | 11/2022 | Fäßler | B66F 7/02 |
| 11,761,250 | B2 * | 9/2023 | Balder | E05F 15/668 160/188 |
| 2004/0182528 | A1 * | 9/2004 | Rieder | E05F 15/676 160/188 |
| 2006/0289128 | A1 | 12/2006 | Ressel | |
| 2009/0193716 | A1 * | 8/2009 | Magill | B44C 1/18 29/897 |
| 2011/0271596 | A1 * | 11/2011 | Schaaf | E05F 15/668 49/358 |
| 2017/0314307 | A1 * | 11/2017 | Imaoka | E05D 15/165 |
| 2023/0265705 | A1 * | 8/2023 | Eliasson | E05D 15/242 49/199 |
| 2023/0323717 | A1 * | 10/2023 | Ion | E05F 15/686 160/188 |

FOREIGN PATENT DOCUMENTS

| | | | | |
|---|---|---|---|---|
| EP | 0523630 | | 1/1993 | |
| JP | 62117972 | | 5/1987 | |
| WO | WO-2015140068 | A1 * | 9/2015 | E05F 15/635 |
| WO | 2019048395 | | 3/2019 | |
| WO | WO-2023166047 | A1 * | 9/2023 | |

OTHER PUBLICATIONS

Swedish Search Report in 2030212-1 mailed Dec. 18, 2020.
UAE Office Action for Application No. P6002761/2022 dated Feb. 20, 2025.

* cited by examiner

DOOR OPERATOR SYSTEM

This application is a 371 of PCT/EP2021/067276, filed on Jun. 24, 2021, published on Dec. 30, 2021 under publication number WO 2021/260085, which claims priority benefits from Swedish Patent Application No. 2030212-1, filed on Jun. 25, 2020, the disclosure of which is incorporated herein by reference.

FIELD OF THE INVENTION

The present invention relates to door operator system for opening and closing an opening.

BACKGROUND ART

A door operator system typically comprises a door connected to a door frame and a drive unit arranged to move the door along the door frame between an closed and open position for opening and closing the opening, and vice versa. Doors typically used as garage doors or as industrial doors. A motor or a mechanical unit such as a spring or a support motor may be used as drive unit to move the door.

In a conventional overhead sectional door an electric motor mounted above the door pulls up the door using wires attached to the door. Such an overhead sectional door often implements balancing springs to reduce the force required to open the door.

Another type of known doors are driven by means of driven pinions interfacing with a fixed rack extending along the intended movement trajectory of the door. Such a door does not require a balancing spring.

A further type of known doors have a door curtain or protective barrier of rigid panels connected to each other. In the opened position, the door has been moved upwards to a horizontal position or has been rolled up in a roll at a drum. During the opening process the door slides into fixed tracks, which are located at both sides of an door opening and above the door lintel on both sides of the door. Lifting devices, such as a timing belt, a roller chain or steel ropes, are connected to a drive unit. The lifting device is fixed to one of the panels and is configured to push the door upwards.

SUMMARY

The disadvantage of doors, which are arranged horizontal in the opened position is that the lowermost part of the door must have support by the fixed tracks, which are located at both sides of the door. Otherwise, the lowermost part of the door will not follow the path of the fixed tracks in a transition area or a track bend between the vertical closed position to the horizontal opened position of the door.

The door may be provided with a drive unit for opening and closing of the door, which drive unit is arranged at the lowermost part of the door. In addition, guide rollers may also be arranged at the lowermost part of the door, which guide rollers are configured to interplay with fixed tracks or frame sections on either side of the door opening. The guide rollers ensure that the lowermost part of the door has support by the fixed tracks.

There is a need to provide a door operation system for opening and closing an opening, which seeks to mitigate, alleviate, or eliminate one or more of the above-identified deficiencies in the art and disadvantages singly or in any combination.

Thus, there is a need to develop a door operation system for opening and closing an opening with reduced complexity for facilitating installation and reducing the need of maintenance.

Further, there is a need to develop a door operation system for opening and closing an opening, which uses cost efficient components.

Further, there is a need to develop a door operation system for opening and closing an opening in which the operating forces are as low as possible.

An object of the present disclosure is therefore to provide a door operation system, which seeks to mitigate, alleviate, or eliminate one or more of the above-identified deficiencies in the art and disadvantages singly or in any combination.

A further object of the present invention is to develop a door operation system with reduced complexity for facilitating installation and reducing the need of maintenance.

A further object of the present invention is to develop a door operation system, which uses cost efficient components.

A further object of the present invention is to develop a door operation system in which the operating forces are as low as possible.

In this disclosure, a solution to the problems outlined above is proposed. In the proposed solution, a door operation system for opening and closing an opening is described. The door operation system for opening and closing an opening comprising: a door frame comprising a first frame section at a first side of the opening and a second frame section at a second side of the opening; a door arranged to be moved between a closed and an open position, the door being movably connected to the door frame; a drive unit mounted on the door, the drive unit comprising at least one motor arranged to move the door from the closed position to the open position and vice versa, and an elongated transmission member extending along at least one of the first side and second side of the opening, wherein the drive unit further comprises a driven transmission member in driving connection with the motor, the driven transmission member being movably connected to the elongated transmission member and arranged to interplay with said elongated transmission member for driving the driven transmission member along said elongated transmission member by the elongated transmission member at least partially wrapping around the driven transmission member, wherein at least one guide member mounted to the door is arranged to interplay with the elongated transmission member for guiding the elongated transmission member into contact with the driven transmission member, wherein the least one guide member comprises a sliding surface on which the elongated transmission member is configured to slide, and wherein the sliding surface has a curvature, which is configured to urge the elongated transmission member to flex and follow the curvature.

Such door operator system will mitigate, alleviate, or eliminate one or more of the above-identified deficiencies in the art and disadvantages singly or in any combination. Further, the complexity of the door operator system will be reduced and the need of maintenance is reduced. The operating forces of the door operator system will be as low as possible. Further, cost efficient components are used in the door operation system.

The door operation system may be applied on an overhead sectional door provided with frame sections, which bend at an angle that can be horizontal over the door opening. The door operation system may also be applied on a vertical lift overhead door, the wall above the door opening in the wall is at least equally high as the door and the door is moving vertically and is guided by frame sections all the way up above the door opening when the door is opened. The door operation system may also be applied on a spiral door, in which the door is rolled up in a spiral above the door opening when the door is opened.

The door frame is configured to guide and hold the door in the closed and opened positions. In addition, the door frame is configured to guide the door when the door moves between the closed and opened positions.

The first frame section at a first side of the opening is configured to guide the door on a first side of the door. The second frame section at a second side of the opening is configured to guide the door on a second side of the door. If the door operation system is an overhead door operator system, each of the first frame section and the second frame section may comprise a vertically extending part, a horizontally extending part and a bent interconnecting part. The door may follow the frame in a guided manner along a trajectory formed by the frame, e.g. the first frame section 4 and the second frame section.

The opening may be arranged in a building, in a wall or in a fence. The opening may have a size and a shape adapted to the specific purpose of the building, wall or fence. If the building is a garage for vehicles, the opening preferably has a size which allows the vehicles to pass through the opening.

The door is configured to cover the opening in order to prevent access through the opening, to prevent or restrict air to flow through the opening and/or to regulate the temperature inside a building. The door may be bendable, flexible or foldable in order to allow the door to change shape during opening and closing. The door may be configured to prevent burglary. The door may be insulated against heat and/or cold. The door is movable from and to the opening in order to opening and closing the opening.

In the closed position, the door cover the opening or a part of the opening.

In the open position, the door has been moved away from the whole opening or from a part of the opening.

The drive unit is configured to move the door from the closed position to the open position and vice versa. The drive unit comprises components, which together cooperate for moving the door. Since the drive unit is mounted on the door, also the drive unit follows the movement of the door.

The at least one motor may be an electrical motor, a hydraulical motor and/or a pneumatical motor. The least one motor is arranged to move the door along the door frame. The least one motor is arranged to move the door along the door frame from the closed position to the open position and vice versa. At least one motor may be arranged at one side of the door adjacent to the first side of the opening. At least one other motor may be arranged at the other side of the door adjacent to the second side of the opening.

The elongated transmission member may extend along the first side of the opening. The elongated transmission member may extend along the second side of the opening. The elongated transmission member may extend along both the first side and second side of the opening.

The driven transmission member is driven by the motor. The motor may transmit torque to the driven transmission member. The motor may transmit rotational movement to the driven transmission member. A gearbox may be arranged between the motor and the driven transmission member. The movably connection between the driven transmission member and the elongated transmission member results in a movability of the drive unit and thus the door along the elongated transmission member. The movable connection of the driven transmission member with the elongated transmission member may be obtained in that the elongated transmission member at least partially wrapping around the driven transmission member. The driven transmission member may engage with the the elongated transmission member when the elongated transmission member at least partially wrapping around the driven transmission member.

The at least one guide member may be mounted to the door. The at least one guide member may be a part of the drive unit. The at least one guide member may be mounted to the drive unit. Thus, the at least one guide member may be mounted to the door via the drive unit. Such guide member may have a small size and may thus need a small space at the door. The interplay between the at least one guide member and the elongated transmission member may result in that the elongated transmission member at least partially wrapping around the driven transmission member. The at least one guide member guides the the elongated transmission member into contact with the driven transmission member.

The a sliding surface is in contact with the the elongated transmission member. The a sliding surface may have low coefficient of friction, so that the elongated transmission member may easily slide on the sliding surface. A friction decreasing member, such as a lubricant may be supplied to the sliding surface and/or the elongated transmission member in order to decrease the friction between the sliding surface and the elongated transmission member. Reducing the friction between the sliding surface and the elongated transmission member may facilitate the opening and closing of the opening by the door. Reducing the friction between the sliding surface and the elongated transmission member may facilitate the movement of the between the closed position and the open position due to low operating forces of the door operator system. Using the at least one guide member comprising the sliding surface will reduce the complexity of the door operator system. In addition, the need of maintenance is reduced.

The curvature of the sliding surface may be adapted to the shape, type and characteristics of the elongated transmission member. When sliding or resting on the sliding surface the elongated transmission member will flex and follow the curvature of the sliding surface. The curvature of the sliding surface and also the position of the sliding surface in relation to the driven transmission member may be selected for an effective interplay between the driven transmission member and the elongated transmission member, and so that the elongated transmission member at least partially wrapping around the driven transmission member.

According to an aspect the sliding surface comprises a guide track for the elongated transmission member. The guide track may guide the elongated transmission member in the elongated direction of the elongated transmission member. In addition, the guide track may prevent the the elongated transmission member to slide an a direction which is ortogonal to the elongated direction of the elongated transmission member. The guide track may increase the interplay between the driven transmission member and the elongated transmission member, so that the elongated transmission member at least partially wrapping around the driven transmission member. The elongated transmission member may be configured to create the guide track in the at least one guide member. Therefore, the guide member may be softer than the elongated transmission member. The guide track may be shaped by the surface pressure from the elongated transmission member acting on the sliding surface of the guide member. The guide track may also be shaped by wear between the elongated transmission member and the sliding surface of the guide member. The elongated transmission member may be configured with harder surface than the sliding surface of the guide member. The elongated transmission member may be configured with a surface which is more wear resistant than the sliding surface of the guide member. The elongated transmission member may have a shape that results in an initial large surface pressure on the guide member or on the sliding surface of the guide member. After an initial creation of the guide track, the surface pressure will be reduced due to the shape of the elongated transmission member. The reduced surface pressure may reduce further formation of the guide drack.

According to an aspect, the curvature of the sliding surface has a radius in the range of 15 mm-50 mm. The curvature of the sliding surface may be adapted to the shape, type and characteristics of the elongated transmission member. The radius in the range of 15 mm-50 mm may allow the elongated transmission member to flex and follow the curvature of the sliding surface. The driven transmission member may also have a radius in the range of 15 mm-50 mm. The radius of the curvature of the sliding surface may correspond to the radius of the driven transmission member.

According to an aspect, the elongated transmission member is in the form of a suspended bendable transmission member. The elongated transmission member may be suspended in the door frame. The elongated transmission member may be suspended in a building, wall or a fence, which comprises the door opening. The elongated transmission member may be bendable. The suspended bendable transmission member may be configured to transform a rotational motion from the driven transmission member to a linear motion of the door. The bendable characteristics of the suspended bendable transmission member may facilitate for the suspended bendable transmission member to at least partially wrapping around the driven transmission member. The bendable characteristics of the suspended bendable transmission member may facilitate for the suspended bendable transmission member to follow the curvature of the sliding surface.

According to an aspect, the system further comprising a resilient panel attached to the door and extending from the bottom horizontal edge of the door, said resilient panel being arranged to come into contact with a floor of the opening when the door is in the closed position. The resilient panel may be resiliently attached to the door, so that the panel may flex, bend or pivoted in relation to the rest of the door. The resilient panel may be resiliently hinged to the door. The resilient panel may be resilient and flexible. When the door is in the closed position for closing the opening, the resilient panel extends from the bottom horizontal edge of the door and is in contact with the floor.

According to an aspect, the elongated transmission member is a belt. The belt may be a timing belt. The belt may be provided with tooth. The driven transmission member may be a toothed pulley configured to transmit a large amount of torque and force to the belt. The belt and the toothed pulley thus have a movably connection. The toothed pulley and belt may together transmit high speeds. Such transmission is reliable and requires a small amount of maintenance. Such transmission is also compact and requires little space. The belt may also follow the curvature of the sliding surface.

According to an aspect, the elongated transmission member is a drive chain. The driven transmission member may be a sprocket configured to transmit a large amount of torque and force to the drive chain. The drive chain and the sprocket thus have a movably connection. The sprocket and drive chain may together transmit high speeds. Such transmission is reliable and requires a small amount of maintenance. Such transmission is also compact and requires little space. The drive chain may also follow the curvature of the sliding surface.

According to an aspect, the sliding surface has a surface hardness, which provides the drive chain to form a guide track for the drive chain in the sliding surface.

The drive chain may be configured to create the guide track in the sliding surface of the at least one guide member. Therefore, the sliding surface of the guide member may be softer than the drive chain. The guide track may be shaped by the surface pressure from the drive chain acting on the sliding surface of the guide member. The guide track may also be shaped by wear between the drive chain and the sliding surface of the guide member. The drive chain may be configured with harder surface than the sliding surface of the guide member. The drive chain may be configured with a surface which is more wear resistant than the sliding surface of the guide member. Due to the shape of the drive chain, the drive chain may exert an initial large surface pressure on the the sliding surface of the guide member. After an initial formation of the guide track, the surface pressure will be reduced due to the shape of the elongated transmission member. The reduced surface pressure may reduce further formation of the guide drack.

According to an aspect, the door comprises a plurality of horizontal and interconnected sections. The sections may be rigid. The sections may be pivotably connected to each other. The sections may be connected to each other by hinges. The sections are horizontal orientated. The interconnections may comprise mechanical hinges or hinges comprising flexible or resilient material. The horizontal and interconnected sections may follow the vertically extending part, the horizontally extending part and the bent interconnecting part during the movement of the door, if the door frame is provided with such parts. At least one drive unit may be mounted on one of the sections. At least one drive unit may be mounted on a plurality of the sections. Two drive units may be mounted one of the sections. At least one drive unit may be arranged at one side of the section adjacent to the first side of the opening. At least one other drive unit may be arranged at the other side of the section adjacent to the second side of the opening.

According to an aspect, the system further comprising a first set of guide rollers mounted to the door arranged to interplay with the first frame section and a second set of guide rollers arranged to interplay with the second frame section. The guide rollers are configured to move together with the door in a guided manner along the trajectory formed by the frame, e.g. the first frame section and the second frame section. The drive unit may be mounted to a bottommost section of the door. The first set of guide rollers may be disposed adjacent to a bottom horizontal end phase of the bottommost section. This is particularly advantageous due to it providing a superior pivoting position of the door. The guide rollers hence creates a common low pivot point for the door when the door is approaching its open position O when the door operator system is an up and over door operator system where the door is in an horizontal position in the open position. This significantly reduces the space required above the door opening compared to for example a door with driven sections utilising for example a fix rack.

According to an aspect, the the drive unit is mounted on a section of the door, whereby a first and second upper guide roller extend from the section towards the first frame section and the second frame section, respectively, and a first and second lower guide roller extend from the section towards the first frame section and the second frame section, respectively.

A first and second upper guide roller accordingly extend from the section towards the first frame section and the second frame section, respectively. Similarly, a first and second lower guide roller extend from the section towards the first frame section and the second frame section, respectively. This may increase the stability and decrease the load on the section onto which the drive unit may be mounted.

According to an aspect, the drive unit is mounted to the bottommost section of the door (8) and the first and second lower guide roller are disposed adjacent to a bottom horizontal end phase of the bottommost section. The section provided with the second lower guide rollers may be the bottommost section and the lower guide rollers are arranged adjacent to the bottom phase of said bottommost section. This is particularly advantageous due to it providing a superior pivoting position of the door. The lower guide rollers hence creates a common low pivot point for the door when the door is approaching its open position O when the door operator system is an up and over door operator system where the door is in an horizontal position in the open position. This significantly reduces the space required above the door opening compared to for example a door with driven sections utilising for example a fix rack.

According to an aspect, one guide roller is rotatably connected to each of the at least one guide member at a position where a centre axis of the guide roller is arranged coaxially with a centre axis of a curvature of the sliding surface of the at least one guide member.

The coaxial arrangement reduces the force on the guide member due to the frame and guide roller taking up some of the load during the movement of the door. Hence, resulting forces to the door sections and bearings of the drive unit and/or guide member are reduced. Furthermore the coaxial arrangement allows for more of the elongated transmission member to be disposed behind the guide rollers which decreases the exposure of said elongated transmission member. The guide roller may be mounted to the door by means of a shaft. The guide roller may be mounted to the door via the guide member by means of the shaft. The shaft may be arranged in the guide member and the guide roller is rotatably mounted to the shaft. The shaft may be fixedly attached to the guide member. The shaft may be axially displaceable in relation to the guide member. The shaft may be rotatably arranged in the guide member. The guide roller may be rigidly attached on the shaft. The centre axis of the guide roller and the centre axis of the shaft may be arranged coaxially with the centre axis of a curvature of the sliding surface of the guide member. The coaxially arrangement of the centre axis of the guide roller and a centre axis of a curvature of the sliding surface of the at least one guide member results in that the centre axis of the guide roller and a centre axis of a curvature of the sliding surface of the at least one guide member have a linear extension along a common horizontal axis. The horizontal axis may extend between the first and second frame section.

According to an aspect, a first upper guide roller is rotatably connected to at least one upper guide member at a position where a centre axis of the guide roller is arranged coaxially with a centre axis of a curvature of the sliding surface of the at least one upper guide member. The coaxial arrangement reduces the force on the upper guide member due to the frame and the first guide roller taking up some of the load during the movement of the door. Hence, resulting forces to the door sections and bearings of the drive unit and/or upper guide member are reduced. Furthermore the coaxial arrangement allows for more of the elongated transmission member to be disposed behind the first guide rollers which decreases the exposure of said elongated transmission member. The first guide roller may be mounted to the door by means of a shaft. The first guide roller may be mounted to the door via the upper guide member by means of the shaft. The shaft may be arranged in the upper guide member and the first guide roller is rotatably mounted to the shaft. The shaft may be fixedly attached to the upper guide member. The shaft may be axially displaceable in relation to the upper guide member. The shaft may be rotatably arranged in the guide member. The first guide roller may be rigidly attached on the shaft. The centre axis of the first guide roller and the centre axis of the shaft may be arranged coaxially with the centre axis of a curvature of the sliding surface of the upper guide member. The coaxially arrangement of the centre axis of the first guide roller and a centre axis of a curvature of the sliding surface of the at least one upper guide member results in that the centre axis of the first guide roller and a centre axis of a curvature of the sliding surface of the at least one upper guide member have a linear extension along a common horizontal axis. The horizontal axis may extend between the first and second frame section.

According to an aspect, one of the guide rollers is rotatably connected to one of the guide member adjacent to the bottom horizontal edge of the door and at a position where a centre axis of the guide roller is arranged coaxially with a centre axis of a curvature of the sliding surface of the at least one guide member. This is particularly advantageous due to it providing a superior pivoting position of the door. The guide roller and the guide member hence creates a common low pivot point for the door when the door is approaching its open position when the door operator system is an up and over door operator system.

According to an aspect, the guide roller is arranged to move in the direction of its centre axis. The guide roller may be mounted to the door by means of a shaft. The guide roller may be mounted to the door via the guide member by means of the shaft. The shaft may be arranged in the guide member and the guide roller is rotatably mounted to the shaft. The shaft may be axially displaceable in relation to the guide member. The shaft may be rotatably arranged in the guide member. The guide roller may be rigidly attached on the shaft. Alternatively, the shaft may be rigidly attached to the guide member, the guide roller may be rotatably arranged on the shaft, and the guide roller may be axially displaceable on the shaft.

Hence, it is to be understood that the herein disclosed invention is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles “a”, “an”, “the”, and “said” are intended to mean that there are one or more of the elements unless the context explicitly dictates otherwise. Thus, for example, reference to “a unit” or “the unit” may include several devices, and the like. Furthermore, the words “comprising”, “including”, “containing” and similar wordings does not exclude other elements or steps.

BRIEF DESCRIPTION OF THE DRAWINGS

The above objects, as well as additional objects, features and advantages of the present invention will be more fully appreciated by reference to the following illustrative and non-limiting detailed description of example embodiments of the present invention, when taken in conjunction with the accompanying drawings.

DETAILED DESCRIPTION

The present disclosure will now be described with reference to the accompanying drawings, in which currently preferred example aspects and embodiments of the disclosure are shown. This disclosure may, however, be embodied in many different forms and should not be construed as limited to the herein disclosed embodiments. The disclosed aspects and embodiments are provided to fully convey the scope of the disclosure to the skilled person.

Figure 1:
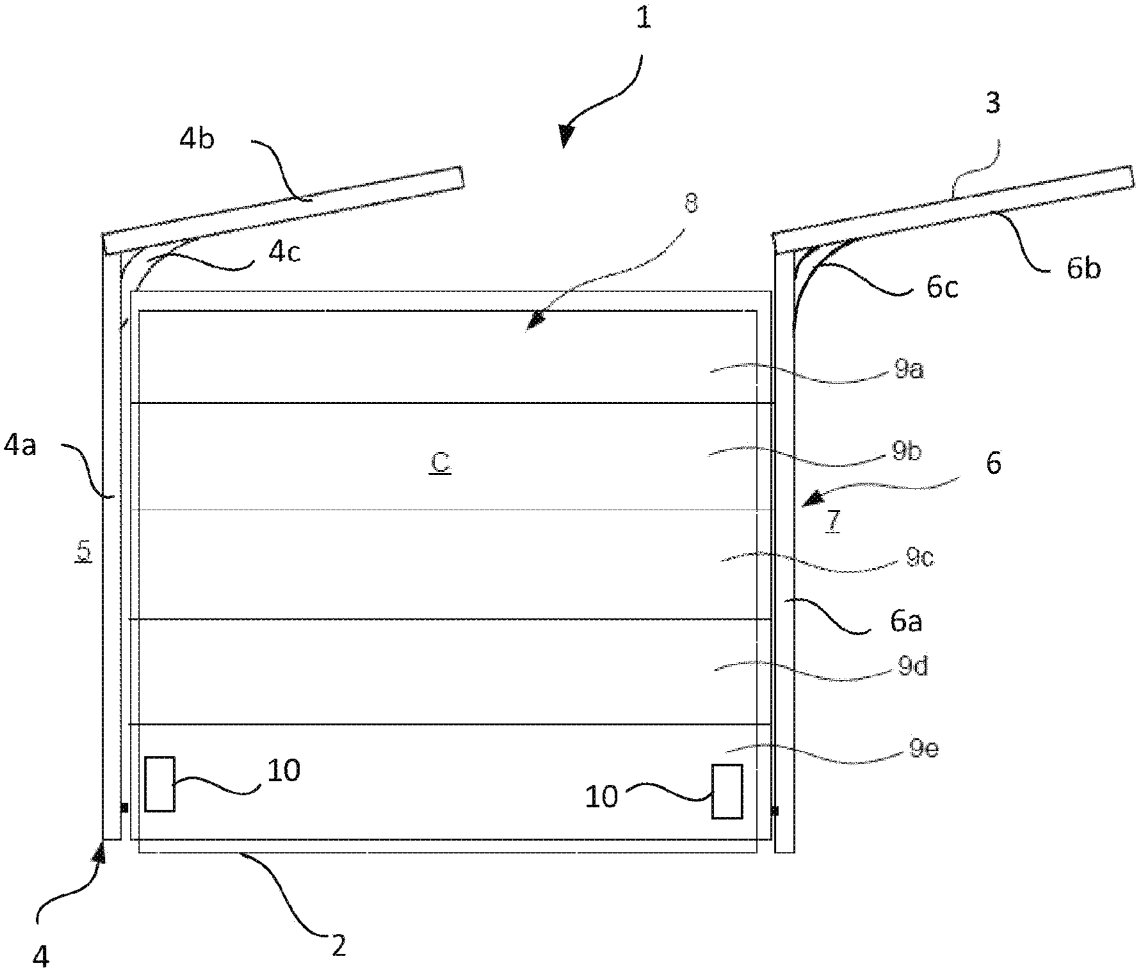
FIG. 1 shows a schematic front view of a door operator system according to the invention, with a door in a closed position.
Figure 2A:
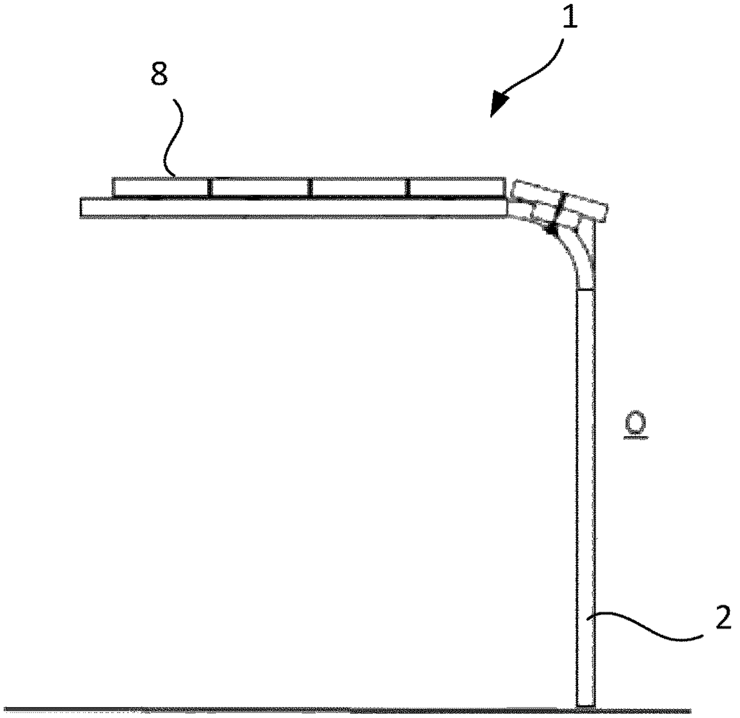
FIGS. 2*a* and 2*b* show schematic side views of a door operator system according to the invention, with the door in an opened and closed position.

FIG. 1 shows a schematic front view of a door operator system 1 according to the invention, with a door 8 in a closed position. The door operation system 1 for opening and closing an opening 2. A door frame 3 comprising a first frame section 4 at a first side 5 of the opening 2 and a second frame section 6 at a second side 7 of the opening 2. A door 8 is arranged to be moved between a closed C and an open O position (FIG. 2*a*). The door 8 is movably connected to the door frame 3. Two drive units 10 are mounted on the door 8. The door 8 comprises a plurality of horizontal and interconnected sections 9*a-e*. The door operation system 1 in FIG. 1 shows an overhead door operator system, wherein each of the first frame section 4 and the second frame section 6 may comprise a vertically extending part 4*a*, 6*a*, a horizontally extending part 4*b*, 6*b* and a bent interconnecting part 4*c*, 6*c*.

Figure 2B:
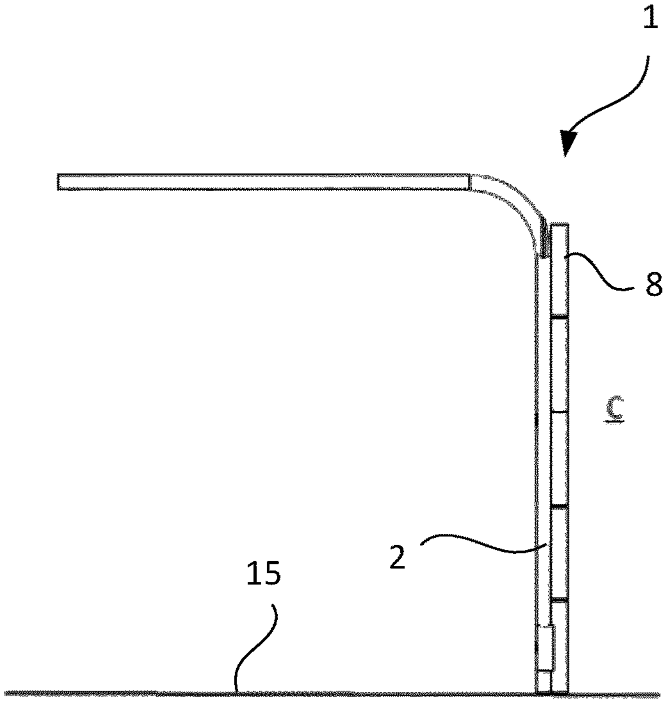

FIGS. 2*a* and 2*b* show schematic side views of the door operator system 1 according to the invention, with the door 8 in an opened O and closed C position. The door 8 is movable from and to the opening 2 in order to opening and closing the opening 2. In the closed C position, the door 8 cover the opening 2 or a part of the opening 2. In the closed C position, the door 8 may rest on a floor 15. In the open O position, the door has been moved away from the opening 2 or a part of the opening 2 and the door 2 is arranged horizontally above the opening 2.

The door operator system may be an overhead door operator system.

Figure 3:
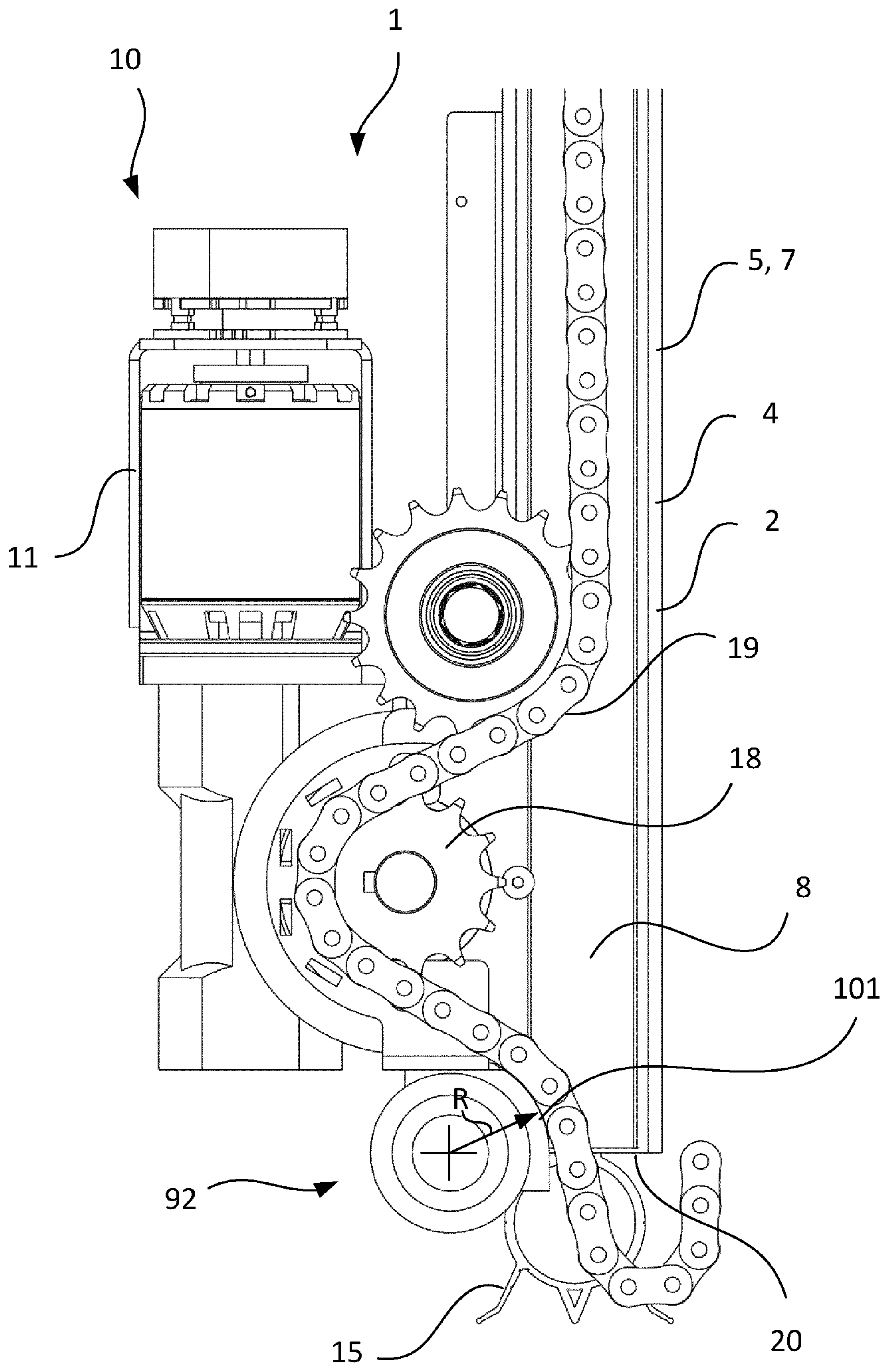
FIG. 3 shows a schematic detail view of a door operator system according to the invention.

FIG. 3 shows a schematic detail view of a door operator system 1 according to the invention. The drive unit 10 comprising at least one motor 11 arranged to move the door 8 from the closed C position to the open O position and vice versa. An elongated transmission member 19 extending along at least one of the first side 5 and second side 7 of the opening 2. The drive unit 10 further comprises a driven transmission member 18 in driving connection with the motor 11. The driven transmission member 18 is movably connected to the elongated transmission member 19 and arranged to interplay with said elongated transmission member 19 for driving the driven transmission member 18 along said elongated transmission member 19 by the elongated transmission member 19 at least partially wrapping around the driven transmission member 18. The elongated transmission member 19 is in the form of a suspended bendable transmission member. The elongated transmission member 19 may be a belt or a drive chain. In FIG. 3 the elongated transmission member 19 is a drive chain.

At least one guide member 92, which is mounted to the door 8, is arranged to interplay with the elongated transmission member 19 for guiding the elongated transmission member 19 into contact with the driven transmission member 18. The least one guide member 92 comprises a sliding surface 101 on which the elongated transmission member 19 is configured to slide. The sliding surface 101 has a curvature, which is configured to urge the elongated transmission member 19 to flex and follow the curvature. The curvature of the sliding surface 101 has a radius R, which may be in the range of 15 mm-50 mm.

The at least one guide member 92 may be mounted to be fixed relative to the door 8. The sliding surface 101 may be fixed relative to the door 8 to facilitate sliding contact with the elongated transmission member.

Worded differently, the at least one guide member 92 comprises a sliding surface 101 arranged to be in sliding contact with the elongated transmission member 19 to guide relative translational movement between the elongated transmission member 19 and the sliding surface 101.

A resilient panel 91 is attached to the door 8 and extending from the bottom horizontal edge 20 of the door 8, said resilient panel 91 being arranged to come into contact with the floor 15 (FIG. 2*b*) of the opening 2 when the door 8 is in the closed position C.

Figure 4:
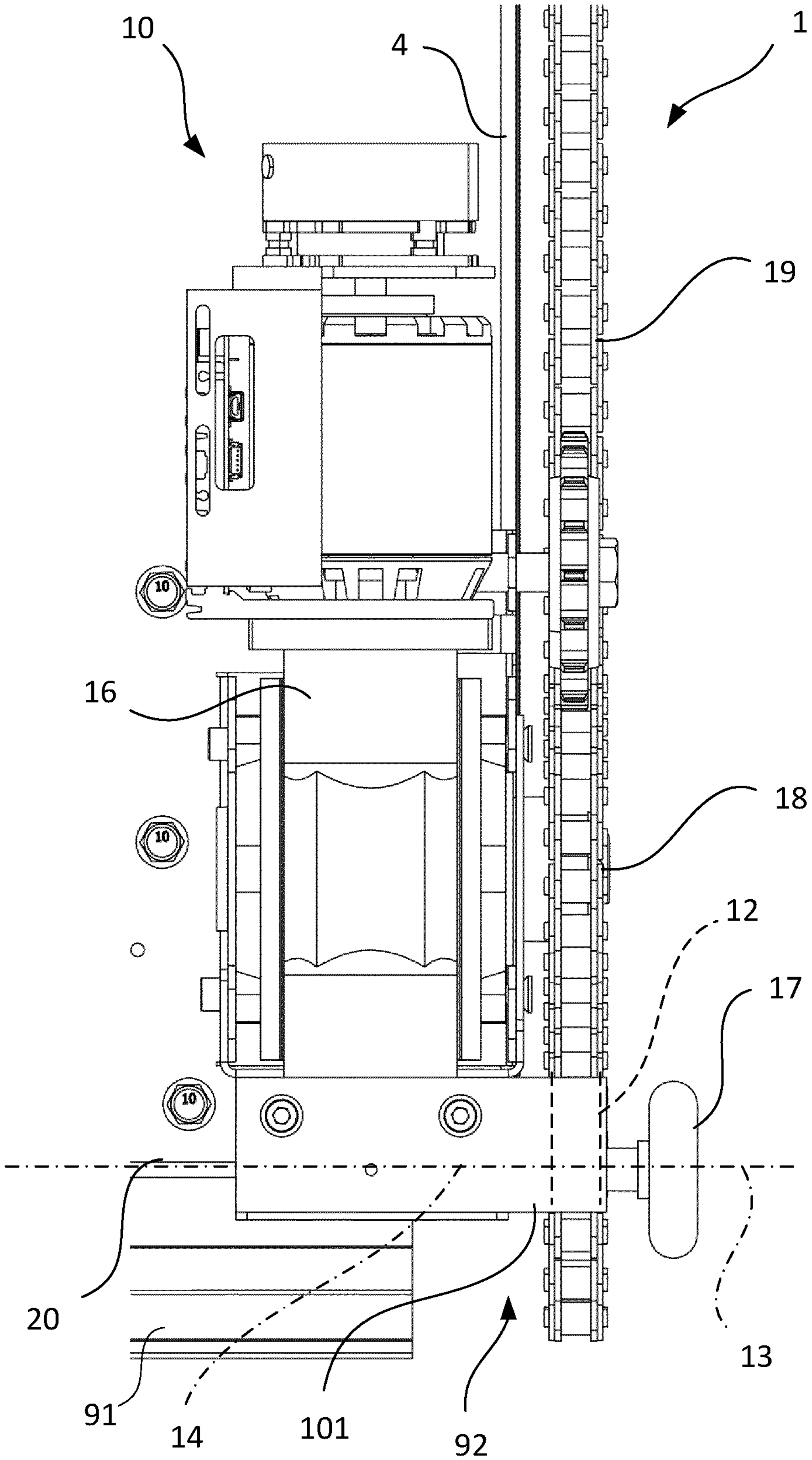
FIG. 4 shows a schematic detail view of a door operator system according to the invention.

FIG. 4 shows a schematic detailed view of a door operator system 1 according to the invention. The sliding surface 101 comprises a guide track 12 for the elongated transmission member 19. The sliding surface 101 has a surface hardness, which provides the drive chain 19 to form the guide track 12 for the drive chain 19 in the sliding surface 101. Sliding surface 101 has a width in the direction transverse to the elongated direction that is larger than the width of elongated transmission member 19.

The sliding surface 101 may be in a polymeric material, such polyamide or polyurethane.

A guide roller 17 is rotatably connected to the guide member 92 at a position where a centre axis of the guide roller 17 is arranged coaxially with a centre axis of a curvature of the sliding surface of the at least one guide member 92. However, the centre axis of the guide roller 17 and the centre axis of a curvature of the sliding surface of the at least one guide member 92 may have different center axis placement. The guide roller 17 is rotatably connected to one of the guide member 92 adjacent to the bottom horizontal edge 20 of the door 8 and at a position where a centre axis 13 of the guide roller 17 is arranged coaxially with a centre axis 14 of a curvature of the sliding surface 101 of the at least one guide member 92. The guide roller 17 is arranged to move in the direction of its centre axis 13. The driven transmission member 18 is driven by the motor 11. The motor 11 may transmit torque to the driven transmission member 18. The motor 11 may transmit rotational movement to the driven transmission member 18. A gearbox 16 may be arranged between the motor 11 and the driven transmission member 18. The movably connection between the driven transmission member 18 and the elongated transmission member 19 results in a movability of the drive unit 10 and thus the door 8 (FIG. 3) along the elongated transmission member 19. The movable connection of the driven transmission member 18 with the elongated transmission member 19 may be obtained in that the elongated transmission member 19 at least partially wrapping around the driven transmission member 18. The driven transmission member 18 may engage with the the elongated transmission member 19 when the elongated transmission member 19 at least partially wrapping around the driven transmission member 18.

Figure 5A:
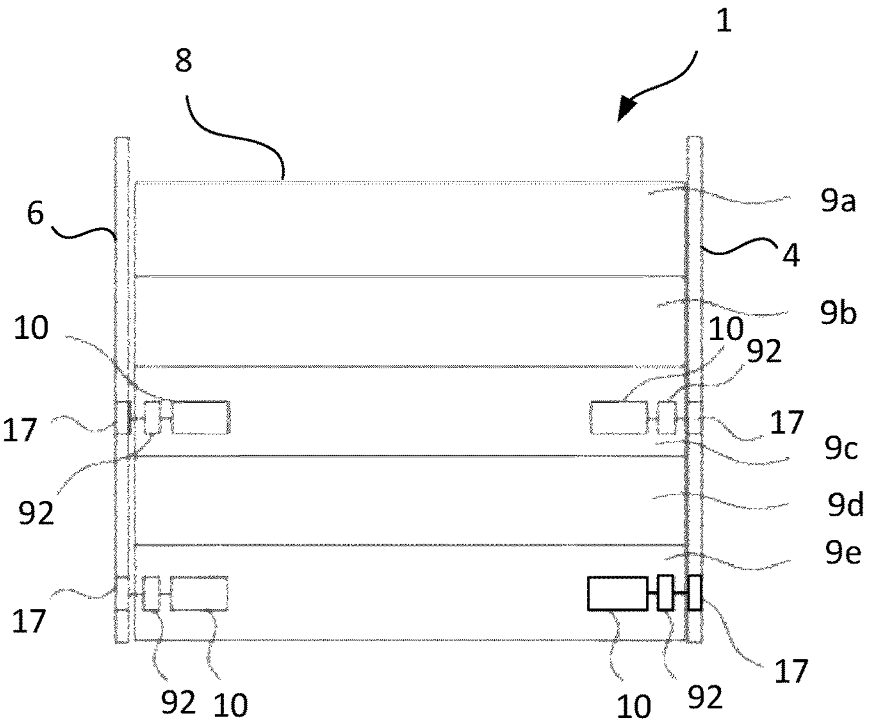
FIGS. 5*a* and 5*b* show schematic front views of a door operator system according to the invention, with the door in a closed positon.
Figure 5B:
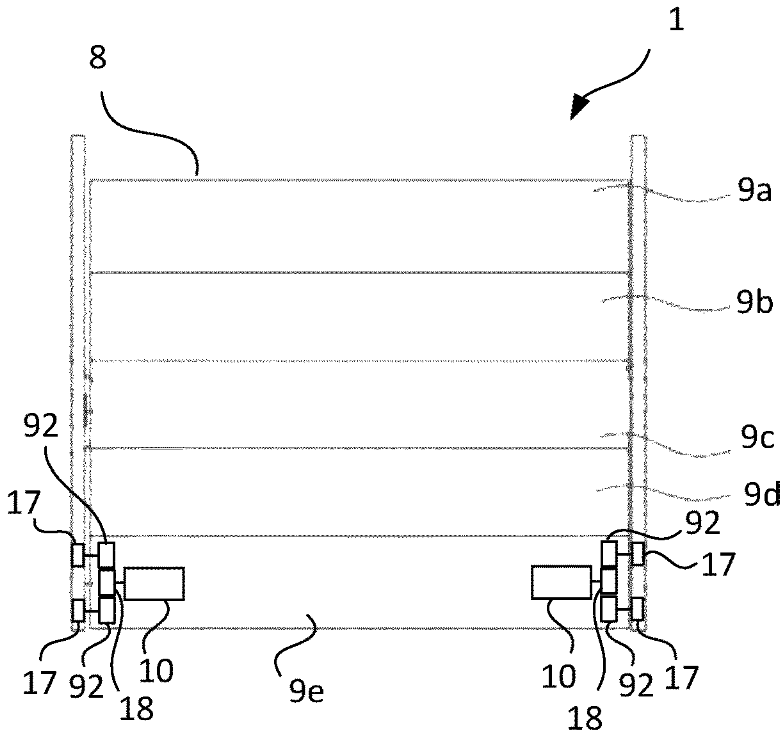

FIGS. 5*a* and 5*b* show schematic front views of a door operator system 1 according to the invention, with the door 8 in a closed positon C. According to FIG. 5*a*, a first set of guide rollers is 17 mounted to the door 8 arranged to interplay with the first frame section 4 and a second set of guide rollers 17 is arranged to interplay with the second frame section 6. Motors 11 are mounted on sections 9*c* and 9*e* of the door 8. A guide member 92 is arranged coaxially with the guide roller 17. According to FIG. 5*b* motors 11 are mounted on the bottommost section 9*e* of the door 8, whereby a first and second upper guide roller 17 extend from the section 9*e* towards the first frame section 4, and a first and second lower guide roller 17 extend from the section 9*e* towards the second frame section 6. The first and second lower guide roller 17 are disposed adjacent to a bottom horizontal end phase of the bottommost section 9*e*. An upper guide member 92 is arranged coaxially with the first upper guide roller 17 and a center axis of the first upper guide roller 17 is rotatably connected to each of the at least one upper guide member 92 at a position where a centre axis of the first upper guide roller 17 is arranged coaxially with a centre axis of a curvature of the sliding surface of the at least one upper guide member 92. The motors 11 are each connected to a driven transmission member 18.

Figure 6:
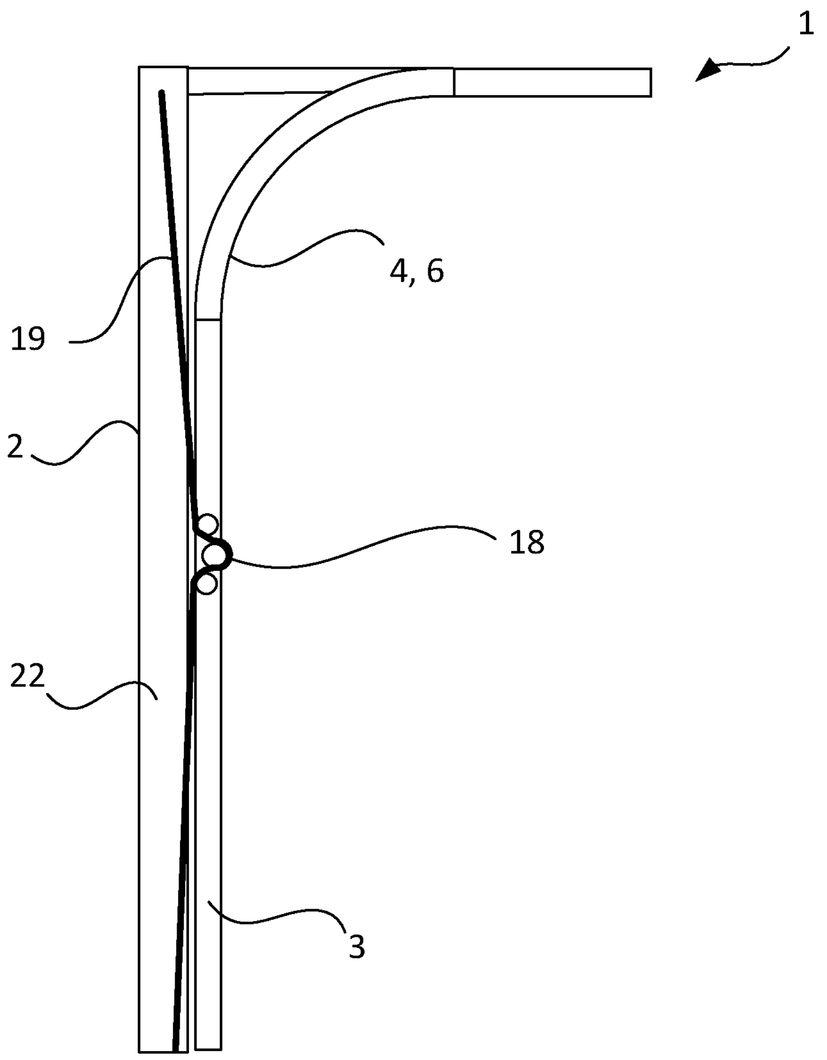
FIG. 6 shows a schematic side view of a door operator system according to the invention.

FIG. 6 shows a schematic side view of a door operator system 1 according to the invention. The elongated transmission member 19 may be suspended in the door frame. The elongated transmission member 19 may be suspended in the door frame 3. The elongated transmission member 19 may alternatively or in combination be suspended in a building, wall a fence 22, which comprises the door opening 2. The elongated transmission member 19 may be bendable. The suspended bendable transmission member 19 may be configured to transform a rotational motion from the driven transmission member 18 to a motion of the door 2, which follows the shape of the first and second frame sections 4, 6. The bendable characteristics of the suspended bendable transmission member 19 may facilitate for the suspended bendable transmission member 19 to at least partially wrapping around the driven transmission member 18. The bendable characteristics of the suspended bendable transmission member 19 may facilitate for the suspended bendable transmission member 19 to follow the curvature of the sliding surface 101 of the guide member 92.

The person skilled in the art realizes that the present invention is not limited to the preferred embodiments described above. The person skilled in the art further realizes that modifications and variations are possible within the scope of the appended claims. Additionally, all aspects and embodiments of the invention could be combined with the other aspects and embodiments of the invention. Additionally, variations to the disclosed embodiments can be understood and effected by the skilled person in practicing the claimed invention, from a study of the drawings, the disclosure, and the appended claims.

The invention claimed is:

1. A door operation system for opening and closing an opening comprising:

a door frame comprising a first frame section at a first side of the opening and a second frame section at a second side of the opening;

a door arranged to be moved between a closed (C) and an open (O) position, the door being movably connected to the door frame;

a drive unit mounted on the door, the drive unit comprising at least one motor arranged to move the door from the closed (C) position to the open (O) position and vice versa, and an elongated transmission member extending along at least one of the first side and second side of the opening, wherein the drive unit further comprises a driven transmission member in driving connection with the motor, the driven transmission member being movably connected to the elongated transmission member and arranged to interplay with said elongated transmission member for driving the driven transmission member along said elongated transmission member by the elongated transmission member at least partially wrapping around the driven transmission member, wherein at least one guide member mounted to the door is arranged to interplay with the elongated transmission member for guiding the elongated transmission member into contact with the driven transmission member, wherein the least one guide member comprises a sliding surface on which the elongated transmission member is configured to slide, wherein a width of the sliding surface is larger than a width of the elongated transmission member, wherein the elongated transmission member forms a guide track in the sliding surface shaped by wear of the elongated guide member against the sliding surface, wherein the sliding surface is rotationally fixed with respect to the door, and wherein the sliding surface has a curvature, which is configured to urge the elongated transmission member to flex and follow the curvature.

2. The system according to claim 1, wherein the curvature of the sliding surface has a radius (R) in the range of 15 mm-50 mm.

3. The system according to claim 1, wherein the elongated transmission member is a suspended bendable transmission member.

4. The system according to claim 1, further comprising a resilient panel attached to the door and extending from the bottom horizontal edge of the door, said resilient panel being arranged to come into contact with a floor of the opening when the door is in the closed position (C).

5. The system according to claim 1, wherein the elongated transmission member is a belt.

6. The system according to claim 1, wherein the elongated transmission member is a drive chain.

7. The system according to claim 6, wherein the sliding surface has a surface hardness less than a surface hardness of the drive chain, wherein motion of the drive chain along the sliding surface forms the guide track in the sliding surface.

8. The system according to claim 1, wherein the door comprises a plurality of horizontal and interconnected sections.

9. The system according to claim 1, further comprising a first set of guide rollers mounted to the door arranged to interplay with the first frame section and a second set of guide rollers arranged to interplay with the second frame section.

10. The system according to claim 8, wherein the drive unit is mounted on a section of the plurality of sections of the door, whereby a first and second upper guide roller extend from the section towards the first frame section and the second frame section, respectively, and a first and second lower guide roller extend from the section towards the first frame section and the second frame section, respectively.

11. The system according to claim 10, wherein the drive unit is mounted to a bottommost section of the door and the first and second lower guide rollers are disposed adjacent to a bottom horizontal end phase of the bottommost section.

12. The system according to claim 9, wherein one guide roller is rotatably connected to each of the at least one guide member at a position where a center axis of the one guide roller is arranged coaxially with a center axis of a curvature of the sliding surface of the at least one guide member.

13. The system according to claim 12, wherein a first upper guide roller is rotatably connected to at least one upper guide member at a position where a center axis of the guide roller is arranged coaxially with a center axis of a curvature of the sliding surface of the at least one upper guide member.

14. The system according to claim 12, wherein a second one of the guide rollers is rotatably connected to one of the guide member adjacent to a bottom horizontal edge of the door and at a position where a center axis of the second guide roller is arranged coaxially with the center axis of a curvature of the sliding surface of the at least one guide member.

15. The system according to claim 12, wherein the center axis of the one guide roller defines an axial direction and wherein the one guide roller moves in the axial direction of the center axis.

* * * * *